Jan. 19, 1965  J. H. TODT  3,166,635
THIN FILM MAGNETIC SHUTTER DISPLAY PANEL
Filed Sept. 25, 1961  5 Sheets-Sheet 1

INVENTOR.
JOACHIM H. TODT
BY Everett J. Schroeder
Kenneth D. Siegfried
ATTORNEYS

INVENTOR.
JOACHIM H. TODT

United States Patent Office 3,166,635
Patented Jan. 19, 1965

3,166,635
THIN FILM MAGNETIC SHUTTER DISPLAY
PANEL
Joachim H. Todt, 301 Rice Creek Terrace,
Minneapolis, Minn.
Filed Sept. 25, 1961, Ser. No. 141,258
22 Claims. (Cl. 178—7.3)

This invention relates to the field of electrical apparatus and more particularly to the field of magnetically operable display panels for producing visual images.

Numerous approaches have been made to the problem of creating a display panel that can be substituted for the present cathode ray tubes while retaining most of the desirable features of the cathode ray tubes and eliminating the undesirable features of the cathode ray type displays. Attempts have been made to use electroluminescent techniques in developing display panels which can take the place of cathode ray tubes, however, such panels have not proven to be more advantageous than the cathode ray tube. Particularly, a large display panel such as may be used for billboards, flight control panels, traffic control displays for aircraft, as well as television, etc., have not been devised which can be used more efficiently and produce a more desirable result than the present systems now in use.

My invention contemplates the use of well established magnetic principles in using a magnetic element within a magnetic field where similar magnetic poles repel and dissimilar magnetic poles attract each other to produce an image. Specifically, by the use of a symmetrical pattern of small light absorbing elements which themselves contain magnetic properties manipulated in a magnetic field, a display panel may be constructed which avoids most of the disadvantages of present day display panels. By the use of conventional lighting methods, and the use of a magnetic light shutter, different images may be created by allowing the light to pass through the shutter in one instance and blocking the light from the observer's view in another instance. By arranging the light absorbing elements in columns and rows, they may be sequentially scanned and controlled to produce images upon the display panel.

The display panel must also incorporate certain memory characteristics so that once the information is applied to the panel in the form of electrical signals, the active elements will be moved in the proper relationship to form the images so desired. By incorporating the memory characteristics of certain magnetic thin films into the movable light absorbing elements, not only does the element have the ability to pass or block light from the observer, but also has the capacity and the properties to store the magnetic information presented to the elements in the form of magnetic impulses. Magnetic films have a number of properties which make them highly desirable as storage devices since thin films embodying these magnetic properties have square hysteresis loops that may be switched rotationally at a speed of one to ten millimicroseconds with magnetic fields or two or three oersteds. Magnetic films used for memory storage and using this type of switching are quite thin and are generally of a thickness of approximately one to three thousand (1,000–3,000) Angstrom (A.) units. Because of the thinness of the magnetic film, it leads to a very desirable type of structure for memory design since the small amount of material needed requires a low flux and also requires a very low voltage to drive the necessary circuitry needed to provide the pulse field used with the thin film elements. As will be set forth later, and in more detail, the thin films may be made in arrays or layers by vacuum deposition processes to increase the ultimate storage capacity of the thin film elements. In fact, well known techniques of etching and vapor deposition may be used in forming the various elements in the display apparatus.

It is therefore a general object of the present invention to provide an improvement in the field of data display panels.

It is yet another object of the present invention to provide a display panel operating on magnetic principles.

It is yet a further object of this invention to provide a visual display panel using controlled light absorbing elements.

It is still another object of the present invention to provide a display panel which may produce colored or gray images.

It is yet another object of this invention to provide apparatus which operates with low voltages and low magnetic fields.

It is still a further object of the present invention to provide a display panel in which the active elements have magnetic memory properties.

It is a further object of the present invention to provide a panel using magnetic thin films.

It is still another object of this invention to provide a visual display panel using an external light source behind the panel and away from the observer.

It is yet another object of this invention to provide a display panel having controlled magnetic fields within the active elements.

It is another object of the present invention to provide a display panel in which the active elements are arranged in columns and rows, or geometrical constructions.

It is a further object of this invention to provide a visual display panel using conventional scanning and television circuits.

It is still another object of the present invention to provide a colored display or a black and white display from television signals.

It is a further object of the present invention to provide a visual display panel using a lens arrangement to increase the definition of the images to be created.

These and other objects and advantages of my invention will more fully appear from the following description, made in connection with the accompanying drawings, wherein like reference characters refer to the same or similar parts throughout the several views; and in which.

Figures 2, 10:
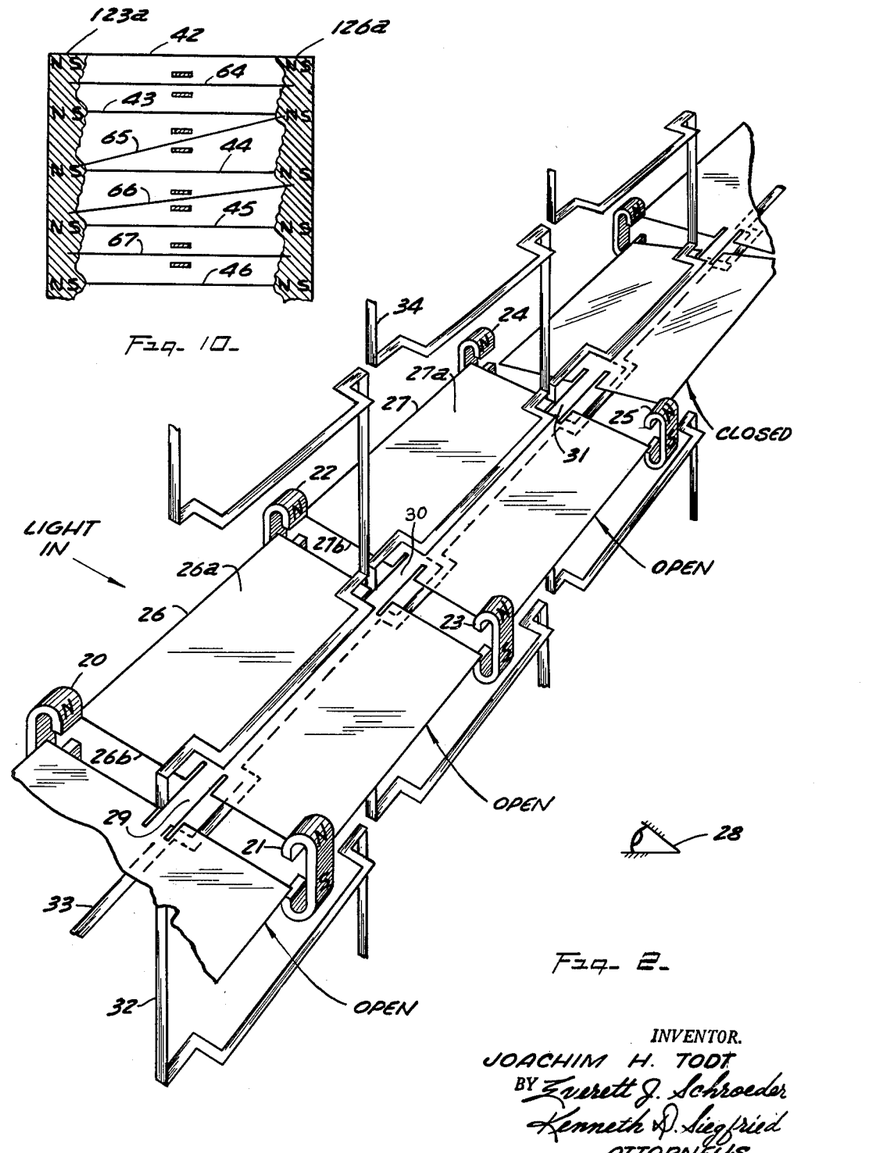
FIG. 2 is an illustrative diagram showing the general principles of operation of the invention.
FIG. 10 is another sectional view of a modification of the magnetic structure as found in FIG. 6.

The general principles of operation of this invention can best be seen by describing the operation of the structure shown in FIG. 2. Three pairs of magnets, 20, 21, 22, 23, 24, and 25 are shown which are generally in a horseshoe or C-shaped form with the pole pieces at the open end of the horseshoe or C shape. Each magnet has a north and south pole and as shown the north and south poles are opposite each other as are the open ends of the horseshoe magnet. Situated adjacent to the edges of magnets 20 through 23, is a vane 26 and situated between the edges of magnets 22 through 25 is a vane 27. Vanes 26 and 27 have magnetic properties and are made of a material which will retain a magnetic field when a magnetic field is created within the vane or elements. The upper and lower surfaces 26a and 26b of vane 26 and the upper and lower surfaces 27a and 27b of vane 27 are coated with a light absorbing material to create a light absorbing or opaque surface so that any light striking the surface will generally be absorbed and not reflected. Vane 26 is of such a dimension that it lies between magnets 20 through 23 adjacent to its outer edges which are the edges closest to a light source and closest to an observer designated by the numeral 28. In other words, the magnets are located between adjacent vanes near the four corners of the vanes but if seen from an edge which is at right angles to the direction light passes through the apparatus, the vanes would extend a greater distance from a central longitudinal axis than the distance from the longitudinal axis to the edge of magnets 20 through 23. The same description also applies to vane 27 with respect to magnets 22 through 25. Situated between magnets 20 and 21 is a hinge portion 29 and situated in opposed relation between magnets 22 and 23 is a hinge member 30, hinges 29 and 30 being used to pivotally rotate vane 26. Hinge 30 is used in conjunction with another hinge 31 to pivotally support and rotate vane 27. Situated above surface 26a and centrally located opposite hinges 29 and 30, is a conducting element 32 which extends above and below vane 26 to lie above other vanes not shown. Electrical conducting element 32 is generally designated as a vertical drive conductor. Situated below vane 26 and opposite surface 26b, but centrally located adjacent hinges 29 and 30, is another conducting element 33 which is generally known as a horizontal drive element. It may be considered that due to the passage of current through the two conducting elements, 32 and 33, that in effect a loop is created about vane 26. Since the current would be flowing in a first direction through one conductor and in an opposite direction through the other conductor, a magnetic field is established in the plane of vane 26. In other words, by applying the magnetic right hand rule, it may be established that a field will exist in the magnetic material forming vane 26 to which a north pole is created on one side of the vane and a south pole is created on the other side of the vane. For certain applications, it may be desirable to add additional conductors so that additional loops may be formed, the loops being symmetrically spaced about the hinges 29 and 30. Upon reversal of the current through conductors 32 and 33, the magnetic field will be reversed and the magnetic north and south poles will be reversed in the material forming vane 26. Applying the principles of magnetic fields, where the vane 26 is magnetized such that the edge nearest magnets 20 and 22 is magnetized north, it will be drawn toward the south pole of magnets 20 and 22 and will be drawn toward the north pole of magnets 21 and 23 on the opposite side of the vane since it would then retain the south magnetic pole. On reversal of the current through conductors 32 and 33 the magnetic poles would be changed in vane 26 and the poles adjacent to the vane would then repel the vane 26 and rotate it in the opposite direction and in the direction of corresponding attraction of the opposite magnetic poles to the movement just described. In like manner, a conductor 34 supplies current to aid in producing a magnetic field in vane 27 and this conducting element is also one of the vertical drive conductors. It will be noted that conducing element 33 extends under vane 27 and continues under the next adjacent vane so that it would lie adjacent to all of the vanes in a particular row whereas the vertical conducting elements lie adjacent to certain vanes within a particular column, coinciding currents in the conducting elements producing the magnetic fields to establish a magnetic field within the vanes. Thus it can be seen that if light enters from the edge of vane 26 on the side containing magnets 20 and 22 that in one instance the light would be blocked where the vane 26 was rotated so that the light falling upon surface 26a were absorbed and if vane 26 were returned to its central position as shown light would pass substantially parallel to vane 26 to be observed by the observer 28. It will also be observed in operation of the apparatus just described that it would be possible to rotate vane 26 in the opposite direction and thus cause light absorbing surface 26b to be used for blocking the light which would ordinarily reach the observer 28 and therefore the vane may be operated in either manner depending upon the relative size and placement of magnets 20 through 23. Ordinarily, the vanes 26, 27, and the others forming the light shutter arrangement are made of molybdenum permalloy which is a nickel-iron compound (approximately 20% iron and 80% nickel) where the thickness ranges from $0.5 \times 10^{-3}$ to $0.125 \times 10^{-3}$ inches in thickness. Obviously, different thicknesses may be used for certain applications and for some applications the film may be deposited on other substrates by vapor deposition in a vacuum. Thin films of this thickness are usually obtainable by rolling the material and are provided in sheet stock which may be etched or cut to form the necessary shapes of the vanes such as vanes 26 and 27.

For certain applications, it may be desirable to reverse the functions of magnets 20 through 23 and vane 26. That is, vane 26 may be formed from a material which contains a permanent magnetic field that will be nondestructive and for some applications may be formed of the same magnetic material as previously mentioned for magnets 20 through 23. In other instances, the preferable material may be deposited by a vacuum deposition method upon a plastic substrate. In any event, the material must be capable of being readily deformed for rotation and capable of retaining the permanent magnetic field. Magnets 20 through 23 would then be formed of a square loop material such as the permalloy previously mentioned so that upon the application of a proper current, the hysteresis loop within the magnetic material could be switched from one state to another. In order to accomplish this, conductors such as conductors 33 and 32 would be placed adjacent to the elements substituted for magnets 20 and 21, and for the elements substituted for magnets 22 and 23. One conductor would be placed on each side of the elements and the hysteresis loop would be changed upon the proper current passing through the conductors in the same manner as previously described for the operation as shown in FIG. 2.

Figure 3:
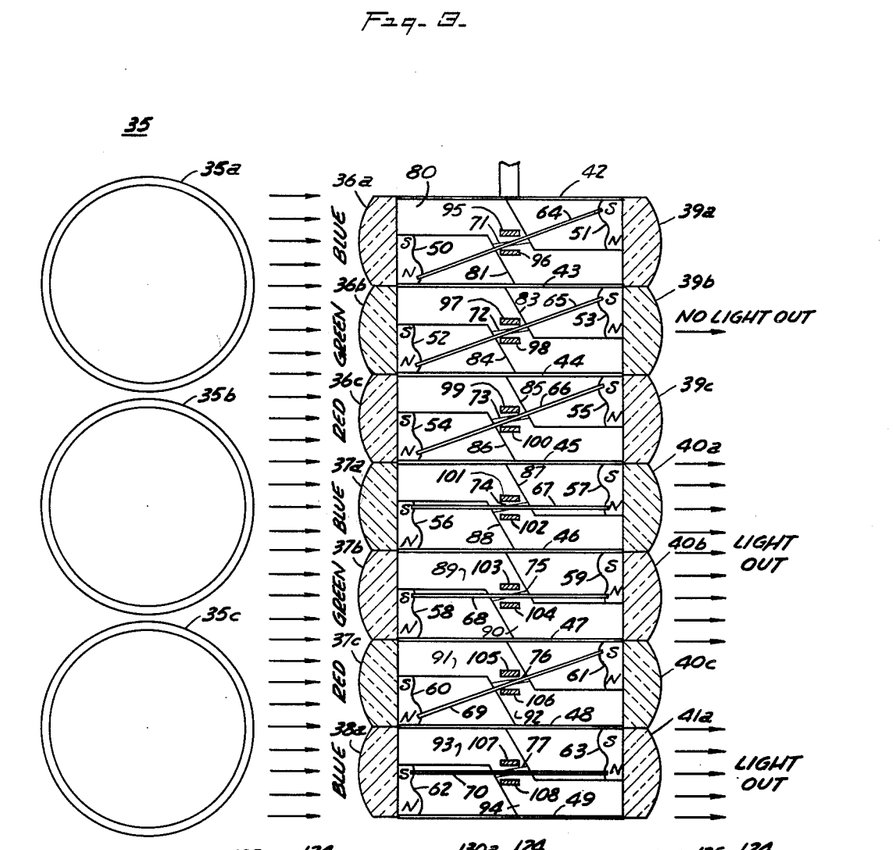
FIG. 3 is a sectional view taken along section lines 3—3 as shown in FIG. 1 and further includes the light source.

For certain applications it may be desirable to increase the resolution of the panel by the use of lenses. Such an arrangement is shown in FIG. 3 where light from light source 35 falls upon an array of lenticular surface lenses 36a, 36b, 36c, 37a, 37b, 37c, and 38a. These lenses are appropriately coated so as to change the white light received from source 35 into the primary colors of blue, green and red. Lenses 36a, 37a and 38a are all coated or formed of material so that a blue light emerges from the lenses. Lenses 36b and 37b are coated or formed of a material to produce a green light and lenses 36c and 37c are coated or formed of a material to produce a red light which would emerge from the lenses. In like manner, at the front of the display panel, another lenticular surface lens is positioned in parallel relationship with the optical axis formed by the lenses just described and these are lenses 39a, 39b, and 39c which are opposite and parallel optically to lenses 36a, 36b, and 36c. Another three lenses 40a, 40b, and 40c are parallel and opposite to lenses 37a, 37b, and 37c. In like manner another lens 41a is opposite lens 38a. The latter mentioned lenses collect the light and project it outwardly toward the observer. So as to form a sort of boxlike structure, a plurality of opaque separating elements 42 through 49 partition the display panel into the boxlike structures just described so that each particular element forms the top of one cell and the bottom of another cell to partition or form the different cells in the assembly making up the panel. The purpose for the opaque light separators such as 42 through 49 is to insure that the light passing through a lens such as 37a would not stray into the cell which is fronted by lens 36c nor stray into the cell fronted by lens 37b, and therefore the light would pass directly through the cell and out through lens 40a. Situated adjacent to lens 36a is a permanent magnet 50 which is formed in the bottom portion of the cell and is also bounded by opaque light separator 43 and another permanent magnet 51 is located adjacent to lens 39a and the upper light separator 42. In other words, at the upper portion adjacent to lens 36a and opaque light separator 42 which is above magnet 50 there is no magnetic structure and adjacent to opaque light separator 43 and lens 39a there is no magnetic structure below magnet 51. In a manner similar to the position of magnet 50, a plurality of magnets 52, 54, 56, 58, 60, and 62 are positioned adjacent to lenses 36b, 36c, 37a, 37b, 37c and 38a respectively. On the other side of the light cell in a manner similar to the position of magnet 51, is a plurality of magnets 53, 55, 57, 59, 61, and 63 which are located adjacent to lenses 39b, 39c, 40a, 40b, 40c, and 41a respectively. These magnets may be formed from any suitable material which will produce a permanent magnet and one such material comprising approximately 50% lead and 50% elongated single domain iron (Lodex) or a compound of gamma-ferric oxide embedded in polyethylene has been found to provide the proper material for forming the magnets. It will be noted that the even numbered magnets 50 through 62 are not of uniform cross section and that in the direction which light passes through lenses 37, 36, and 38, that the portion designated N is of greater thickness than the portion designated S (the S and N symbols referring to the south or north poles of the magnets). In like manner, the uneven numbered magnets 51 through 63 have a cross sectional area in which the portion of the magnet labeled S is of greater dimension in the direction of light radiation through the lenses than the portion labeled N. Situated between magnets 50 and 51 is a thin film element 64 and situated between magnets 52 and 53 is a thin film element 65 and located between magnets 54 and 55 is a thin film element 66. In like manner, a plurality of thin film elements 67 through 70 are located between magnets 56 and 57, magnets 58 and 59, magnets 60 and 61, and magnets 62 and 63 respectively. Each thin film element 64 through 70 includes a rotatable supporting member or hinge and these are designated as numerals 71 through 77 respectively. Hinges 71 through 77 are each held in place by a pair of supporting elements 80 through 94 respectively. That is, elements 80 and 81 cooperate with hinge 71, elements 83 and 84 cooperate with hinge 72, etc. For some applications, particularly analogue applications displaying images requiring contrasts in the background of half tone content, the hinges may be prestressed instead of lying parallel with the thin film elements which are parallel to the optical axis in the open position. Supporting elements 80 through 94 are symmetrical and are situated above and below the magnets which are located adjacent to the edges of thin film elements 64 through 70. In other words, the magnets and supporting elements are located radially opposite the hinges so as to fit between adjacent thin film elements making up the panel. It will also be seen that it may be desirable to have a magnetic field of varying field density or strength. The radial edges of the thin film elements form a varying air gap with the magnets since the magnets have different cross sectional dimensions and for the case shown in FIG. 3, the air gap between the magnets and the thin film elements decreases as the vane for thin film elements is rotated into a light blocking position. In order to rotate the thin film elements 64 through 70 it is necessary to supply the proper magnetic field to the magnetic retaining material and this is accomplished through the use of a pair of conductors 95 through 108 associated with each of the thin film elements 64 through 70 respectively. In other words, conductors 95 and 96 are respectively located above and below hinge 71 to supply the proper magnetic field to thin film element 64 to produce the proper magnetic field therein. In like manner, conductors 97 and 98 are respectively located above and below hinge 72 to produce the proper magnetic field in thin film element 65, etc. Since magnets such as 50 through 63 are located so that thin film elements 64 through 70 rotate through a limited angle of approximately 20° it will be seen that when the thin film elements are adjacent the permanent magnets where the air gap is the greatest, that the thin film elements are substantially parallel to the optical axis and allow the light to pass through each of the cells and emerge toward the observer. Where the proper magnetic field has been created in the thin film element, the thin film element is then rotated (in the illustration given, in a counterclockwise direction) light will be blocked from passing through the cell toward the observer and since the thin film elements 64 through 70 contain light absorbing surfaces such as described as surfaces 26a and 26b for element 26 in FIG. 2, any light impinging upon the thin film elements will be absorbed and not reflected and therefore the observer will see a relatively dark area opposite that particular light cell. As shown in FIG. 3, light would enter lenses 37a, 37b, and 38a and pass through the cell and emerge outwardly from lenses 40a, 40b and 41a. The other cells would allow light to pass through lenses 36a, 36b, 36c and 37c, but because the thin film elements in these cells would be rotated in a light absorbing position, lenses 39a, 39b, 39c, and 40c would not have any light emerging from them toward the observer. It should also be kept in mind that as seen by the observer, lenses 39a, 39b, and 39c form one particular light dot or square to produce the particular color desired from the primary colors of red, green and blue which are coated upon lenses 36c, 36b, and 36a respectively. Of course, a black and white presentation may be made with such a display panel by properly connecting the driving conductors 95 through 108. One of the important features to keep in mind is that the magnetic field produced by each of the current conductors 95 through 108 is not sufficient in itself to cause movement of thin film elements 64 through 70, but upon application of current to both conductors associated with each thin film, the thin film will rotate to the position other than the one it occupies. Furthermore, at some time during the operation of the display panel, the currents must coincide or be synchronized to cause movement of the thin film elements but they do not necessarily have to remain applied to the conductors for the amount of time required for the thin film elements to actually rotate. In other words, two pulses of current may be applied simultaneously to the cooperating conductors associated with each thin film element and once the magnetic field is stored in the movable element, the current may be removed from the conductors. The thin film element will then move to its proper position and remain there until the next current pulses are applied to the conductors to change the magnetic field and cause reversal of the direction of movement of the thin film element. Even when mechanical forces such as shock and vibration are applied to the vane, it will remain or return to the destinated position because the information is stored in the hysteresis loop of the magnetic material of the vane.

Figure 5:
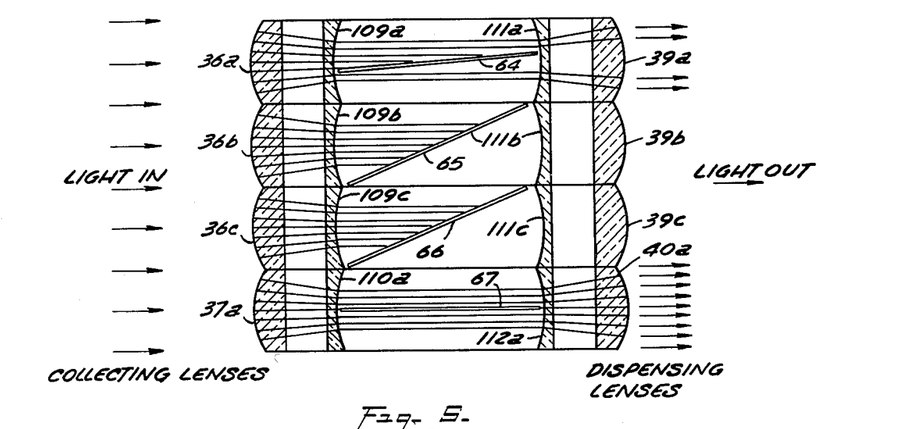
FIG. 5 is a diagram of a lens system used with the display panel to improve the definition or resolution of the images.

To improve the resolution of the magnetically operable display panel, different lenses may be used to help direct or collimate the light and therefore in certain applications the opaque light separators may be removed between the different cell-like structures. By placing a plurality of plano-concave lenses between lenses 36a, 36b, and 36c (as found in FIG. 5) and the cooperating thin film elements 64, 65, and 66 respectively, the light may be collimated and moved away from the upper and lower edges of the light cells so that the opaque light separators may be eliminated. Another set of plano-concave lenses 111a, 111b, 111c, and 112a are then placed between the film elements 64 through 67 and lenses 39a, 39b, 39c, and 40a respectively. With this type of lens arrangement the light is again dispersed outwardly and is diverged into lenses 39a, 39b, 39c and 40a so that the proper image is viewed by the observer. For this type of arrangement it will be noted that each of the cells is relatively void of light near the top and bottom edges and for some applications this particular construction may be desirable.

Figures 4, 7:
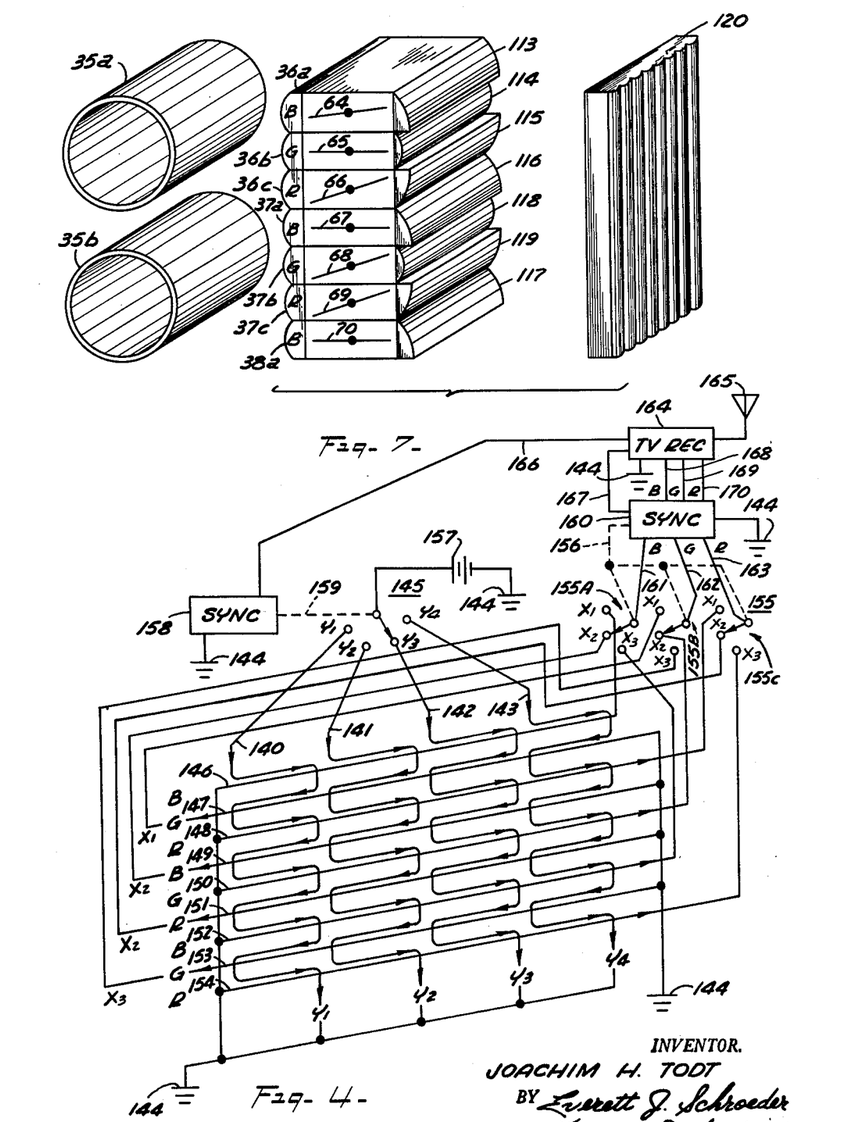
FIG. 4 is a block diagram showing the relative electrical circuits and their relation to the display panel when used with a television receiver.
FIG. 7 is a diagram of a lens arrangement in which the definition of the image is improved.

To provide a further improvement for a color display, the construction shown in FIG. 7 produces certain desirable characteristics over the lens arrangements thus far shown. It will be remembered that a square formed of the three separate cells, each having a different color characteristic are used to form the particular color for that square or spot. For this particular construction, an optical technique for focusing the output of the three cells making up each color group is used where the output screen or front plate of the panel has the light projected onto it in coincidence at the one particular area on the front of the panel. A horizontal Fresnel lens arrangement is used to focus and direct the output of the various light cells. This is accomplished by the use of a convex segment 113 which is placed with the curved surface toward the viewer and opposite lens 36a along with another pair of elongate lenses 114 and 115 which are opposite lenses 36b and 36c. Lens 114 is of a concave shape formed from an outer segment of a cylindrical member and lens 115 is identical to lens 113 but reversed in a vertical plane. Another pair of lenses 116 and 117 identical to lens 113 are placed in front of thin film elements 67 and 70 respectively and accomplish the same purpose as lens 113. Another lens 118 identical to lens 114 is placed in front of thin film 68 to cooperate with the lens 37b and another lens 119 is placed in front of thin film element 69 to cooperate with lens 37c. A front screen 120 of the display panel is then placed adjacent to lenses 113 through 119 and there is formed on the outer face of screen 120, a plurality of vertical cylindrical lenses. The front screen may also take on different shapes to accomplish the same purpose, and these may be spherically shaped lenses or frosted glass may be used for dispersion of the light. By the use of a sheet such as 120 and lenses 113 through 119, a substantial increase in the resolution of the image is obtained.

Figure 1:
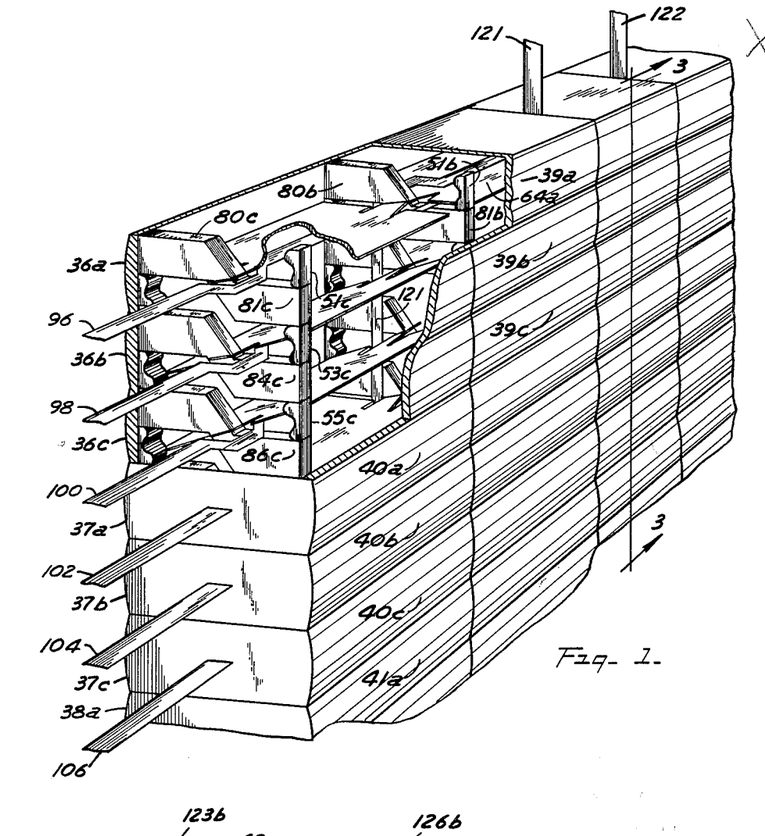
FIG. 1 is a partial front view showing the general form of the display panel apparatus where the corner outer structure has been broken away.

A corner of the complete panel is shown in FIG. 1 with the upper left hand corner outside portions of the panel removed so that the inner structure may be seen. Where similar structure is found in FIG. 3, similar references are made to the parts and construction shown. It will be noted specifically that the horizontal drive conductors 96, 98, 100, 102, 104, and 106 are placed under the corresponding thin film elements and that the hinges of the thin film elements are clamped between the mating supporting elements. It will also be observed that a vertical drive conductor 121 extends across the top of the thin film elements and downwardly to be directed across the top of the next corresponding thin film cooperating with that particular color. In other words, as shown in FIG. 1, conductor 121 extends across the top of thin film element 64a and downwardly and would pass across the top of thin film element 67. As seen in FIG. 3, conductor 95 would then be interconnected to conductor 101. This will be seen more clearly by a further explanation of the wiring within the panel as set out in FIG. 4. Another vertical drive conductor 122 is shown which moves in a similar manner to be directed with another particular color. In other words, all of the conductors lying directly above the thin film elements representative of a particular color are interconnected in a column and all of the conductors lying under the thin film elements in a given row are interconnected. The opaque light separators such as 42 through 49 shown in FIG. 3 have been omitted from the view seen in FIG. 1 to more clearly show the other working elements of the panel.

The operation of the display panel just described, is generally associated with a movement of the thin film elements such that they are rotated to either a closed position or open position and would not necessarily stop at some intermediate point between the open and closed positions. However, for certain types of applications in which a grey image or image of varying shadows and tone qualities are desired, rotation of the thin film elements to some point intermediate between the open and closed position would produce the different shadows and contrasts necessary for images such as those found in the display of television. By a slight modification of the invention as just described, the apparatus may be constructed in such a manner that the thin film elements may rotate to an intermediate position while retaining the information which is induced into the magnetic material forming the thin film elements and is retained in a memory or storage sense.

Films of permalloy (approximately 20% Fe and 80% Ni) which are oriented by deposition in the presence of a magnetic field and which use a low coercive force are now in use in computer storage systems. Such work was conducted by M. S. Blois and is set forth in the Journal of Applied Physics, volume 26 (1955, page 957) in an article entitled, "Preparation of Thin Magnetic Films and Their Properties." Since then, it has been determined that a rotational coercive force and the proper switching of the square hysteresis loop are the crucial elements in the use of thin films to memory applications. The rotational behavior is characterized by a parameter called the anisotropy field $H_k$, which is the magnitude of the magnetic field perpendicular to the easy axis required to rotate the magnetization 180°. The driving currents required for the memory operation are determined by the anisotropy field $H_k$ and therefore this field must be controlled in magnitude and uniformity The usual permalloy film created by vacuum deposition has a uniaxial anisotropy field $H_k$ along which the magnetization lies. These films have their magnetic fields switched through 180° by an applied field $H_c$. Switching time for switching the field through 180° may be decreased considerably by the application of a field perpendicular or transverse to the easy direction (which is parallel to the $H_k$ direction). The films are therefore operated in a bistable sense and for this type of operation, the anisotropy field $H_k$ is greater than the applied field $H_c$ (Olsen, Pohm, and Rubens, Armour Symposium on "Relaxation of Ferromagnetic Materials," April 4–6, 1956, Armour Research Foundation of Illinois Institute of Technology). Most of the commonly used nickel-iron thin films such as permalloy in which the anisotropy field $H_k$ is greater than the applied field $H_c$, operate in such a manner that the magnetization seeks the easy direction in the absence of an applied field and the film has a rectangular hysteresis loop in the easy direction only.

Another important parameter in the operation of the thin film, is the remanence which is defined as the flux occurring in the film at right angles to the drive energy as the amplitude of the drive energy passes through zero. This remanence is usually a function of the angle between the drive field and the "hard" magnetic direction of the thin film. Generally, the remanence increases from zero where the angle between the driving field and the hard magnetic field direction is zero, to some maximum value, that occurs for most nickel-iron thin films such as permalloy at an angle less than 20°. Remanence then decreases from this maximum describing a curve which approximates the cosine function. Using this type of operation, it is possible to obtain switching speeds of under ten millimicroseconds with magnetic fields of four or five oersteds. In fact, the switching time can be made equal to 0.1 microsecond which is extremely fast and falls well within the range of the video pulses from television, and radar receivers.

For certain types of applications it may become necessary to superimpose one thin film upon another to obtain optimum operation of the memory properties of the thin films. One such method is to use a plastic substrate such as mylar thin film and vapor deposit the particular patterns upon the thin film to produce the memory system required. Such an element would generally be comprised of a mylar thin film upon which has been deposited by vapor deposition, the square loop magnetic film such as the permalloy just described and upon which are deposited low loss magnetic films in symmetrical patterns about the square loop magnetic film material to conduct the external magnetic lines of force into proximity with the square loop material in the form of motor pole pieces. Generally speaking, the permalloy material is deposited centrally on the mylar thin film and preferably in circular shape, a round pole piece shape and the low loss magnetic film material which may actually overlap the square loop material or take on other shapes to form air gaps is deposited over the remaining mylar film in symmetrical patterns. The conductors which will be used to bias and drive the square loop magnetic thin film material may then be positioned at different angles with respect to each other to produce the optimum results. That is, in some cases the conductors may be parallel to each other and in other cases the conductors may actually cross each other at a particular angle. In this type of operation, a relatively large transverse field $H_t$ (approximately 6 oersteds) is applied to the thin film as a bias. This field is sufficient to saturate the film in a transverse direction. Another field is then applied along the easy axis, the direction of this field being either up or down, that is at right angles to the transverse field, the phase depending on the polarity of the incoming signals. The directions in which the conductors are placed, correspond to the directions in which the different magnetic fields are created, and the currents carried by the conductors cause the hysteresis loop in the permalloy material to rotate through 180°. For a further detailed description of the treatment of thin films, see Electronics Industries, September 1961, for an article by John Watkins entitled, "A Survey of Thin Film Technology."

Figure 6:
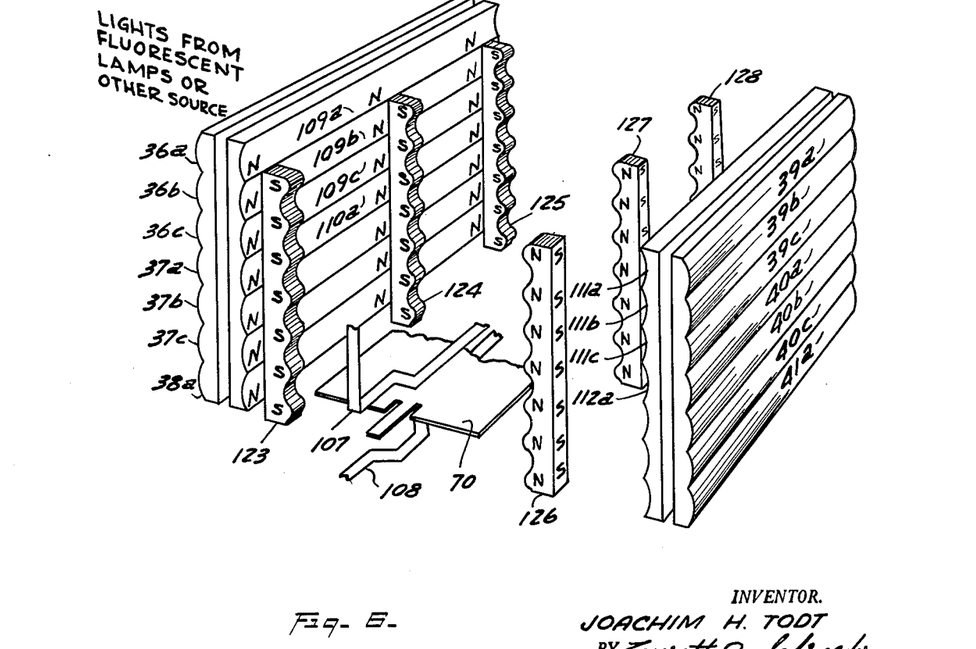
FIG. 6 is a broken away section of a typical panel showing the magnetic pole arrangement of the magnetic elements when used with an analogue type display.
Figure 8:
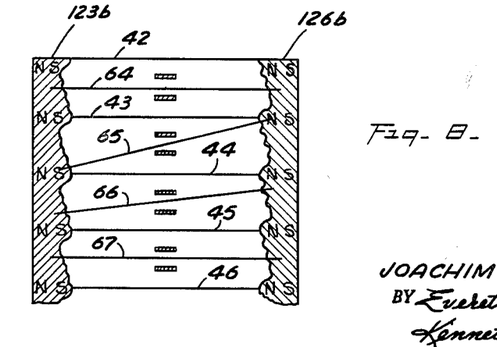
FIG. 8 is a sectional view of a modification of the magnetic structure as found in FIG. 6.
Figure 9A:
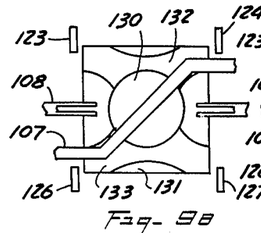
FIGS. 9a, 9b, and 9c are illustrative diagrams of different forms which the magnetic memory material and its associated pole pieces may assume.
Figures 9B, 9C:
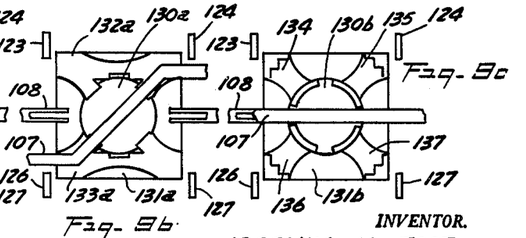

For the type of display just described in which it is desirable to rotate the thin film element to an intermediate position between the open and closed position, the magnetic structure as set forth in FIG. 6 is preferred. Three magnetic strips 123, 124, and 125 are substituted for the magnets such as 50, 52, 54, etc. as found in FIG. 3. It will be noted that instead of having the poles oriented substantially perpendicular to the plane of the thin film element, that the poles are aligned substantially parallel to the plane of the thin film element 70 and that the air gap is variable from an open to a closed position. While the magnetic strips are shown to be a continuous magnet having north poles extending down one side and south poles extending down the other, the strip may be broken up into individual magnets if desirable. In a like manner, three magnetic strips 126, 127, and 128 are substituted for magnets 51, 53, 55, 57, etc. and they are formed in a manner similar to magnetic strips 123 through 125. It will be noted that the magnetic poles are arranged so that the north pole appears adjacent to thin film element 70 whereas in magnetic strips 123 through 125 the south pole appears adjacent the thin film element 70. As to the location of the magnetic structures 123 through 128, it will be seen that they are radially displaced from the hinge or rotational supporting elements in the same manner as the magnets shown in FIGS. 1 and 3. Several other variations of the magnetic structure such as found in magnetic strips 123 and 126 are shown in FIGS. 8 and 10 in which it will be noted that the air gap as formed in strip 123a of FIG. 10 is varied in discreet steps where the air gap is generaly increasing as the thin film elements rotate from their open to closed position. For some applications it may be found that it is desirable to reverse this type of structure and in FIG. 8, magnetic strips 123b and 126b are shown in which the air gap is decreasing as the thin film element rotates from an open to a closed position. The air gap is decreased in discreet steps in the same manner as shown in FIG. 10. To improve the storage function, it may be desirable to change the configuration of the thin film elements and the conductors and this can best be seen by reference to FIGS. 9a through 9c. Magnetic strips 123, 124, 126, and 127 are shown in their same relative position as that given for FIG. 6 and it may be assumed that the other thin film elements such as those about to be described would be used in each of the light cells forming the panel. The horizontal drive conductor 108 is shown in each of FIGS. 9a through 9c and the vertical drive conductor 107 is also shown, it being observed that conductor 107 is oriented in a plane parallel to the opaque separators if they are used or parallel to the thin film element in its open position and are positioned at an angle with respect to the horizontal drive conductors 108 in FIGS. 9a and 9b. For the configuration shown in FIGS. 9a and 9b, conductor 107 would generally lie parallel to the easy axis of the hysteresis loop as described above. It is generally known that the so called easy axis may be placed in any particular orientation merely by changing the magnetic field while the particular magnetic storage material is being vacuum deposited upon a substrate. Different types of substrates may be used to form the thin film elements, some of which may be mylar, Teflon, or other suitable plastic materials which may be readily deformed at the hinge are of the thin film element. In FIG. 9a the permalloy film is deposited in a dot 130 in the center of a mylar film 131 which forms the thin film element. Adjacent to the edge of mylar dot 130, a pair of pole pieces are formed of a single outstretched pattern of low loss magnetic film material to form what may be described as something similar to motor pole pieces and this is designated as numeral 132 which cooperates with magnetic strips 123 and 124 and is designated as 133 where it cooperates with magnetic strips 126 and 127. In fact, both the dot 130 and the pole pieces 132 and 133 may be formed from the same type of material such as permalloy where the dot is formed in a magnetic field by vacuum deposition and where the pole pieces are formed without the presence of a magnetic field. A similar structure is found in FIG. 9b except that pole pieces 132a have portions in the form of teeth which overlay and form air gaps with, the dot of the permalloy material. In other words, the dot 130 is formed of an anisotropy permalloy and the pole pieces are formed from isotropic material. In FIG. 9c, it will be seen that the magnetic storage material 130b is centrally located upon a thin film of mylar or suitable material 131b and symmetrically located about storage dot 130b are four pole pieces 134 through 137. It will be noted that the pole pieces have somewhat jagged edges where they communicate with magnetic strips 123, 124, and 126 and 127 so that a varying air gap is produced. Also, it will be noted that pole pieces 134 through 137 overlap and overlie the magnetic storage dot 130b. It will, of course, be understood that the overlying portions of the low loss magnetic material are insulatedly formed over the storage material. Using this type of construction, the pulses may be placed upon the conductors so that they appear simultaneously opposite the square loop material such as found in the permalloy dots 130, 130a, and 130b and the pulses are retained and stored in the material. Thus, very short pulses such as set forth above of the magnitude of 0.1 microsecond may be used to actuate the thin films and thus cause their rotation at some time later. With reference to United States television standards, the transmitter band width is 4 megacycles and therefore the shortest possible pulse is approximately 0.25 microsecond in width. It is quite obvious that the mechanical movement required to rotate the thin film can not be accomplished in such a short period of time and therefore upon storage of this short pulse and movement of the thin film element at a time later, produces the desired effect. Since the thin film element takes approximately 1 millisecond to rotate, storage of the pulse in the thin film material is highly desirable and upon such storage the thin film element may be caused to rotate at a time much later than when the pulse was applied. For some applications, it may be desirable to place what would be called an "erase" pulse upon the appropriate conductors to cause the hysteresis square loop to be reversed and drive the thin film element into a closed or open position depending upon the mode of operation.

To show a typical operation of the display panel as just described when used in conjunction with a television receiver, the block diagram of FIG. 4 is set forth and is merely illustrative of the type of system in which the panel may be placed. Numerous driving circuits or scanning circuits have been developed and are well known to those skilled in the art for supplying pulses of the type just described to the horizontal and vertical drive conductors. The A. M. Marks Patent 2,670,402 shows one type of scanning device in which a delay line is used to sequentially scan the different circuit elements and such a scanning means may be used for the television application. Another driving, scanning means which may be used with my invention is that shown in the J. A. Rajchman et al. Patent 2,904,626. The requirements for producing colored images on television are generally well known to those skilled in the art and are described briefly in "Electronic and Radio Engineering," by F. E. Terman, McGraw-Hill Publishing Company, 4th edition, pages 999–1010, and specifically in FIGS. 25–21 and 25–26. In regards to the United States standards mentioned above, there are generally 525 lines produced for a television receiver which correspond to 525 rows in the present invention and this would constitute approximately 700 columns. The television receiver in such a circuit demodulates the incoming television signals and produces pulses which are representative of the colors in the appropriate component magnitudes. In the system shown and described in FIG. 4, a portion of a complete panel is shown and it is merely an extension of the teachings set forth herein to supply the necessary equipment for a complete panel. Four vertical conductors 140 through 143 are situated adjacent to each of the thin film elements found in four different columns. That is, conductor 140 is placed above each of the thin film elements and interconnected through the entire column. In like manner, conductors 141 through 143 are also connected. The conductors are terminated at one end by a ground connection 144 and conductor 140 is connected to a switch terminal $Y_1$ of a four position switch 145. Conductor 141 is connected to another terminal $Y_2$ of switch 145, conductor 142 is connected to a terminal $Y_3$, and conductor 143 is connected to a terminal $Y_4$. Nine horizontal conductors 146 through 154 pass under each of the thin film elements in a particular row which forms the panel. These were generally described previously as the horizontal drive conductors and conductors 146, 148, 150, 152, and 154 are all terminated in a ground connection 144 and conductors 147, 149, 151, and 153 are also terminated in a ground connection 144. Conductor 146 is connected to a terminal $X_1$ of a section 155a of a switch 155. Conductor 149 is connected to terminal $X_2$ of section 155a and conductor 148 is connected to terminal $X_3$ of switch section 155a. It will be noted that all of these conductors just mentioned, that is, conductors 146, 149, and 152 are all associated with the thin film element in the cell having the blue color associated with it. Conductor 147 is connected to $X_1$ of a switch section 155b of switch 155, conductor 150 is connected to terminal $X_2$ of switch section 155b and conductor 153 is connected to a terminal $X_3$ of switch section 153b. All of these conductors are associated with the particular cells displaying the green color. Conductor 148 is connected to a terminal $X_1$ of a section 155c of switch 155, conductor 151 is connected to terminal $X_2$ of section 155c and conductor 154 is connected to terminal $X_3$ of section 155c. Each of the conductors associated with switch section 155c corresponds to a light cell providing a red color. The switch arms of switch sections 155a, 155b, and 155c are all interconnected by a common shaft 156. Switches 145 and 155 may be described as selector circuits and are shown diagrammatically as switches, it being understood that any type of switch may be suitable here such as electronic switches of the flip-flop, multivibrator or other bistable device. A voltage source represented by a battery 157 has one terminal connected to ground 144 and the other terminal connected to the wiper arm of switch 145 to supply a voltage to each of the vertical conductors. Associated with switch 145 is a synchronizer 158 which is electrically connected to ground 144 and is mechanically connected to the wiper arm of switch 145 through a shaft 159. Another synchronizer 160 is also connected to ground 144 and has three output conductors, 161, 162, and 163 connected to the wiper arms of switch sections 155a, 155b, and 155c respectively. Conductor 161 carries the signals representative of the blue color, conductor 162 carries signals representative of the green color, and conductor 163 carries signals representative of the red color. A television receiver 164 is shown in general block diagram form having an antenna 165 connected thereto, for receiving transmitted television signals and the output of the television receiver is applied to synchronizers 158 and 160 through a pair of conductors 166 and 167. The television receiver is also connected to ground 144 and has three outputs which are supplied to synchronizer 160 through three connecting leads 168 through 170. Conductor 168 supplies the blue signals to synchronizer 160, conductor 169 supplies the green signals to synchronizer 160, and conductor 170 supplies the red signals to synchronizer 160.

As the color signals are supplied from television receiver 164, to the color synchronizer 160, let it be assumed that switch 155 is in the position shown, that is, the blue signal is directed to conductor 149, the green signal is conducted to conductor 150, and the red signal is conducted to conductor 151. Since synchronizer 158 has the switch arm of switch 145 in contact with terminal $Y_3$, conductor 142 is actuated and therefore the block or group of cells which are interconnected by these conductors is energized and the appropriate color is displayed at that block. In other words, synchronizer 158 synchronizes the proper column with the proper row which is energized by synchronizer 160. Since the thin film elements bearing the square loop magnetic material have the ability to retain the pulses and be rotated to their appropriate positions after the pulses have passed by and are actually in coincidence with other elements, the images are formed after the electrical signals have passed by. Since a finite period of time is required to scan all of the different conductors making up the different light cells, there is sufficient time to form the image before the next pulses are received to prevent a new image.

For applications such as radar, where a P.P.I. (Planned Position Indicator) is to be used the display panel may be formed into a circular panel by forming the columns in spiral fashion and separate the circuits for each column and row by 360°. The same result may also be obtained by providing concentric circles where each circle has the row scanning circuit applied to it and where the elements appear in substantially a radial line they would be connected in the same manner as the columns mentioned previously. Substantially the same type of operation would be required as set forth for the television application described above.

Upon examination of the description set forth herein, it will be obvious that the invention has provided an improvement in the field of data display panels by setting forth a new teaching. Structure has been set forth showing that a display panel may be built operating on magnetic principles where a plurality of thin film elements have been used. The disclosure has set forth the necessary disclosure to show the operation of both a grey or colored presentation and by the use of the vacuum deposition techniques or other well known techniques in providing magnetic material having a square loop, a suitable display device has been described which may be used for television or radar purposes. The structure does not depend upon elements such as generally found in cathode ray tubes and the light sources are readily available for replacement and are of inexpensive design.

It will, of course, be understood that various changes may be made in the form, details, arrangement and proportions of the parts without departing from the scope of my invention which consists of the matter shown and described herein and set forth in the appended claims.

I claim:

1. A magnetically operable display panel for producing visual images for an observer comprising: thin film means including supporting means, said thin film means having magnetic properties and light absorbing surfaces constructed and arranged for limited movement under predetermined conditions; said thin film surfaces being oriented generally in a plane normal to that in which the images are formed; current conducting means cooperating with said thin film means for conducting a plurality of energizing currents therethrough to control the movement of said thin film means; magnetic field producing means located in opposed and non-communicating relationship from said supporting means and cooperating with said thin film means for controlling the position thereof; and intermittently controlled energizing means connected to said current conducting means so that light is allowed to pass towards, and be blocked from the view of the observer in accordance with said limited movement of said thin film means whereby images are produced on said display panel.

2. The invention as set forth in claim 1 including light radiating means positioned behind said thin film means so that light rays directed toward the observer are allowed to pass by said movable thin film means when in a first predetermined position and are blocked from passing said thin film means when in a second predetermined position.

3. The invention as set forth in claim 1 including opaque separating means located opposite said light absorbing surfaces to cooperate with said thin film means in allowing light to pass towards, and be blocked from, the view of the observer.

4. A magnetically operable display panel for producing visual images for an observer comprising: thin film means including rotatable supporting members, said means having magnetic properties and light absorbing surfaces constructed and arranged for limited rotational movement with said rotatable member under predetermined conditions; current conducting means parallel and adjacent to said rotational axis to cooperate with said thin film means for conducting a plurality of energizing currents therethrough to control the movement of said thin film means; magnetic field producing means located in non-communicating radial spaced relation from said rotatable supporting members and cooperating with said thin film means for controlling the rotational position thereof; and intermittently controlled energizing means connected to said current conducting means so that light is allowed to pass towards, and be blocked from, the view of the observer in accordance with said limited rotational movement of said thin film means whereby images are produced on said display panel.

5. A magnetically operable display panel for producing visual images for an observer comprising: a plurality of movable light absorbing elements including supporting members having magnetic properties; a plurality of first electrical current conducting means for conducting current in a first direction, there being at least one cooperating with each of a first surface of said plurality of movable light absorbing elements; a plurality of first interconnecting means for interconnecting said plurality of first electrical current conducting means; a plurality of second electrical current conducting means for conducting current in a direction opposite to said first direction, there being at least one cooperating with each of a second surface of said plurality of movable light absorbing elements; a plurality of second interconnecting means for interconnecting said plurality of second electrical current conducting means; a plurality of first magnetic elements located in opposed spaced relation from said supporting members but between said plurality of movable light absorbing elements; and a plurality of second magnetic elements located in opposed spaced relation from said first magnetic elements so that said supporting members are disposed in non-communicating relationship therebetween, said second magnetic elements also being interposed between said plurality of movable light absorbing elements, said plurality of first and second electrical current conducting means cooperating with said plurality of first and second magnetic elements to allow light to pass towards, and be blocked from, the view of the observer upon movement of said light absorbing elements to a predetermined position when said first and second electrical conducting means are energized.

6. The invention as set forth in claim 5 including a light source positioned behind said plurality of movable light absorbing elements so that light rays directed toward the observer are allowed to pass by said plurality of movable light absorbing elements when in a first predetermined position and are blocked from passing said light absorbing elements when in a second predetermined position.

7. The invention as set forth in claim 6 including a pair of transparent sheets, one of which is located between said light source and said plurality of first magnetic elements and the second of which is located between said observer and said plurality of second magnetic elements, both of which are fixedly held in position with respect to each other.

8. The invention as set forth in claim 7 including opaque separating means located opposite said light absorbing surfaces to cooperate with said movable light absorbing elements in allowing light to radiate towards, and be blocked from, the view of the observer.

9. A magnetically operable display panel for producing visual images for an observer comprising: a plurality of rotatable light absorbing elements having magnetic properties, said elements including rotatable supporting members; a plurality of first electrical current conducting means for conducting current in a first direction, there being at least one located adjacent to each of a first surface of said plurality of movable light absorbing elements and aligned parallel with said supporting members; a plurality of first interconnecting means for interconnecting said plurality of first electrical current conducting means; a plurality of second electrical current conducting means for conducting current in a direction opposite to said first direction, there being at least one located adjacent to each of a second surface of said plurality of movable light absorbing elements and aligned parallel with said supporting members, said first and second electrical current conducting means being symmetrically arranged about said supporting members; a plurality of second interconnecting means for interconnecting said plurality of second electrical current conducting means; a plurality of first magnetic elements located in radially opposed spaced relation from said supporting members but between said plurality of rotatable light absorbing elements; and a plurality of second magnetic elements located in radially opposed spaced relation from said first magnetic elements so that said supporting members are disposed in non-communicating relationship therebetween, said second magnetic elements also being interposed between said plurality of movable light absorbing elements, said plurality of first and second electrical current conducting means cooperating with said plurality of first and second magnetic elements to allow light to radiate towards, and be blocked from, the view of the observer upon rotation of said light absorbing elements to a predetermined position when said first and second electrical conducting means are energized.

10. The invention as set forth in claim 9 wherein said first and second magnetic elements include magnetic structure having magnetic poles aligned in a plane substantially normal to said first and second light absorbing surfaces of said light absorbing elements and having a magnetic field of varying density variable as said light absorbing elements are moved with respect to said magnetic field producing means.

11. A magnetically operable panel for producing visual images for an observer comprising: a first, second, and third plurality of movable light absorbing elements having magnetic properties and supporting members, said elements arranged in columns and rows and having forwardly and rearwardly facing edges, side edges, and upwardly and downwardly facing light absorbing surfaces, observation of said light absorbing elements being made from a direction facing said forwardly facing edges; a plurality of first electrical current conducting means for conducting current therethrough, there being at least one cooperating with each of said plurality of movable light absorbing elements; a plurality of first connecting means for connecting independently in columns, all of said first electrical current conducting means; a plurality of second electrical current conducting means for conducting current therethrough, there being at least one cooperating with each of said plurality of movable light absorbing elements; a plurality of second connecting means for connecting independently in rows, all of said plurality of second electrical current conducting means cooperating with said first plurality of light absorbing elements; a plurality of third connecting means for connecting independently in rows, all of said plurality of second electrical current conducting means cooperating with said second plurality of light absorbing elements; a plurality of fourth connecting means for connecting independently in rows, all of said plurality of said second electrical current conducting means cooperating with said third plurality of light absorbing elements; opaque separating means located opposite said light absorbing surfaces to cooperate with said light absorbing elements in controlling the amount of light dispersed between said plurality of light absorbing elements; and a plurality of first and second magnetic elements located in opposed spaced relation from each other with said supporting members therebetween, and being further located between adjacent side edges of said plurality of movable light absorbing elements, said plurality of first and second electrical current conducting means cooperating with said plurality of first and second magnetic elements for causing movement of said light absorbing elements to allow light to pass in a direction substantially parallel to said upwardly and downwardly facing surfaces and towards said rearwardly facing edges when said first and second electrical conducting means are energized in a first predetermined manner, and blocking light absorbing surfaces in the path of said radiation when said first and second electrical conducting means are energized in a second predetermined manner.

12. The invention as set forth in claim 11 wherein said light absorbing elements include thin plastic elements upon each of which is deposited a centrally located element of material having a composition of approximately 80% Fe and 20% Ni with square hysteresis loop properties capable of storing magnetic fields and changes thereto, adjacent to which is deposited a plurality of symmetrically spaced pole pieces of magnetic material insulatedly separated from said centrally located element.

13. The invention as set forth in claim 12 wherein at least one of said plurality of first and second electrical current conducting means is located at an angle with respect to said supporting members in a plane parallel to said opaque separating means to supply driving signals to said centrally located element.

14. The invention as set forth in claim 11 including a transparent sheet having a plurality of first, second, and third primary colors formed in rows and spaced outwardly from at least one of said forwardly and rearwardly facing edges of said light absorbing surfaces and disposed vertically so that said sheets are centrally located with respect to said opaque separating elements.

15. The invention as set forth in claim 11 including a light source positioned rearwardly and outside of said plurality of first, second, and third transparent sheets to radiate towards said rearwardly facing edges of said light absorbing elements.

16. The invention as set forth in claim 15 wherein the rows of said transparent sheet are formed into elongate lenses to converge and diverge the rays of light from said light source.

17. A magnetically operable display panel for producing visual images for an observer comprising: thin film means including hinge means, said thin film means having magnetic properties and light absorbing surfaces constructed and arranged for limited movement under predetermined conditions; current conducting means cooperating with said thin film means for conducting a plurality of energizing currents therethrough to control the movement of said thin film means; magnetic field producing means located in opposed spaced relation from said hinge means and cooperating with said thin film means for controlling the position thereof; supporting means constructed and arranged to hold said hinge means in non-communicating and operative relationship with said magnetic field producing means; light radiating means positioned behind said thin film means so that light rays are directed towards the observer; and intermittantly controlled energizing means including a television receiver for receiving output signals representative thereof; synchronizing apparatus responsive to said receiver output signals to provide the proper synchronization signals for horizontal and vertical scanning; first and second selector circuits responsive to said synchronizing apparatus for energizing said current conducting means; and video frequency circuit means responsive to said receiver output signals connected to one of said first and second selector circuits to provide a modulating voltage representative of the image to be produced.

18. The invention as set forth in claim 17 wherein said thin film means includes a thin plastic element upon which is formed a centrally located element of anisotropic material having square hysteresis loop properties capable of storing magnetic fields and a plurality of isotropic low loss magnetic pole pieces.

19. The invention as set forth in claim 17 wherein said magnetic field producing means includes magnetic structure having magnetic poles aligned in a plane substantially parallel to said light absorbing surfaces of said thin film means.

20. The invention as set forth in claim 19 wherein said magnetic field producing means cooperating with said thin film means includes magnetic structure having a magnetic field of varying magnetic density as said thin film means are moved with respect to said magnetic field producing means.

21. A magnetically operable display panel for producing visual images for an observer comprising: first thin film means including rotatable supporting members, said means having magnetic properties for retaining a nondestructive permanent magnetic field and including light absorbing surfaces constructed and arranged for limited movement with said rotatable member under predetermined conditions; second thin film means located in radial spaced relation from said rotatable supporting members and cooperating with said first thin film means for controlling the rotational position thereof; current conducting means parallel and adjacent to said second thin film means to cooperate with said second thin film means for conducting a plurality of energizing currents therethrough to control the movement of said first thin film means; and intermittently controlled energizing means connected to said current conducting means so that light is allowed to pass toward, and be blocked from, the view of the observer in accordance with said limited rotational movement of said first thin film means whereby images are produced on said display panel.

22. A magnetically operable display screen for producing visual images for an observer comprising: a plurality of movable light absorbing elements including supporting members having magnetic properties; said elements being oriented generally in a place aligned normal to that in which the images are formed; a plurality of first electrical current conducting means for conducting current in a first direction, there being at least one cooperating with each of a first surface of said plurality of movable light absorbing elements; a plurality of first interconnecting means for interconnecting said plurality of first electrical current conducting means so that they form a first plurality of lines described by a geometrical construction; a plurality of second electrical current conducting means for conducting current in a direction opposite to said first direction, there being at least one cooperating with each of a second surface of said plurality of movable light absorbing elements; a plurality of second interconnecting means for interconnecting said plurality of second electrical current conducting means so that they form a second plurality of lines described by a geometrical construction; a plurality of first magnetic elements located in opposed spaced relation from said supporting members but between said plurality of movable light absorbing elements; and a plurality of second magnetic elements located in opposed spaced relation from said first magnetic elements so that said supporting members are disposed in non-communicating relationship therebetween and interposed between said plurality of movable light absorbing elements, said plurality of first and second electrical current conducting means cooperating with said plurality of first and second magnetic elements to allow light to pass toward, and be blocked from, the view of the observer upon movement of said light absorbing elements to a predetermined position when said first and second electrical conducting means are energized.

References Cited in the file of this patent

UNITED STATES PATENTS

| 1,919,115 | Maury et al. | July 18, 1933 |
| 1,957,815 | Baird | May 8, 1934 |
| 1,984,208 | Engl | Dec. 11, 1934 |
| 2,025,143 | Zworykin | Dec. 24, 1935 |
| 2,946,879 | Powers | July 26, 1960 |
| 3,017,625 | Evans et al. | Jan. 16, 1962 |

FOREIGN PATENTS

| 536,471 | Italy | Dec. 2, 1955 |